United States Patent
Ives

(10) Patent No.: US 8,596,964 B2
(45) Date of Patent: Dec. 3, 2013

(54) TURBINES HAVING A DEBRIS RELEASE CHUTE

(75) Inventor: James Ives, Dublin (IE)

(73) Assignee: OpenHydro Group Limited, Dublin (IE)

(*) Notice: Subject to any disclaimer, the term of this patent is extended or adjusted under 35 U.S.C. 154(b) by 765 days.

(21) Appl. No.: 12/373,487

(22) PCT Filed: Jul. 13, 2007

(86) PCT No.: PCT/EP2007/006236
§ 371 (c)(1),
(2), (4) Date: Sep. 29, 2009

(87) PCT Pub. No.: WO2008/006603
PCT Pub. Date: Jan. 17, 2008

(65) Prior Publication Data
US 2010/0068037 A1    Mar. 18, 2010

(30) Foreign Application Priority Data
Jul. 14, 2006    (EP) ..................................... 06014703

(51) Int. Cl.
*F01D 25/32*    (2006.01)

(52) U.S. Cl.
USPC .......... 415/121.2; 415/220; 415/228; 416/189

(58) Field of Classification Search
USPC ................ 415/220, 221, 228, 121.2; 416/189
See application file for complete search history.

(56) References Cited

U.S. PATENT DOCUMENTS

| | | | |
|---|---|---|---|
| 228,467 A | 6/1880 | Maclay | |
| 928,536 A | 7/1909 | Pino | |
| 1,710,103 A | 4/1929 | Nelson | |
| 2,054,142 A | 9/1936 | Sharp | |
| 2,470,797 A | 5/1949 | Thomas | |
| 2,501,696 A | 3/1950 | Souczek | |
| 2,563,279 A * | 8/1951 | Rushing | ......................... 415/4.3 |
| 2,658,453 A | 11/1953 | Walters | |
| 2,782,321 A | 2/1957 | Fischer | |
| 2,792,505 A | 5/1957 | Baudry | |
| 2,874,547 A | 2/1959 | Fiore | |
| 3,078,680 A | 2/1963 | Wapsala | |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

PCT International Search Report for International Application No. PCT/EP2007/006236 dated Aug. 31, 2007.

(Continued)

*Primary Examiner* — Edward Look
*Assistant Examiner* — Christopher R Legendre
(74) *Attorney, Agent, or Firm* — Gardner, Linn, Burkhart & Flory, LLP

(57) ABSTRACT

In a hydroelectric turbine having a rotor disposed within a housing, the rotor having an annular outer rim received by a channel in the housing, the improvement comprising providing at least one debris release chute in said housing such that debris captured between the rotor and the housing is released through the debris release chute.

5 Claims, 4 Drawing Sheets

(56) References Cited

U.S. PATENT DOCUMENTS

| | | | |
|---|---|---|---|
| 3,209,156 A | 9/1965 | Struble, Jr. | |
| 3,292,023 A | 12/1966 | Korber | |
| 3,342,444 A | 9/1967 | Nelson | |
| 3,355,998 A | 12/1967 | Roemisch | |
| 3,384,787 A | 5/1968 | Schwartz | |
| 3,422,275 A | 1/1969 | Braikevitch et al. | |
| 3,477,236 A | 11/1969 | Burrus | |
| 3,487,805 A * | 1/1970 | Satterthwaite et al. | 440/67 |
| 3,708,251 A | 1/1973 | Pierro | |
| 3,986,787 A | 10/1976 | Mouton | |
| 3,987,638 A | 10/1976 | Burkhardt et al. | |
| 4,095,918 A | 6/1978 | Mouton et al. | |
| 4,163,904 A | 8/1979 | Skendrovic | |
| 4,219,303 A * | 8/1980 | Mouton et al. | 415/7 |
| 4,274,009 A | 6/1981 | Parker, Sr. | |
| 4,367,413 A | 1/1983 | Nair | |
| 4,421,990 A * | 12/1983 | Heuss et al. | 290/53 |
| 4,427,897 A | 1/1984 | Migliori | |
| 4,523,878 A | 6/1985 | Richart et al. | |
| 4,541,367 A | 9/1985 | Lindberg | |
| 4,613,762 A | 9/1986 | Soderholm | |
| 4,720,640 A * | 1/1988 | Anderson et al. | 290/43 |
| 4,740,711 A | 4/1988 | Sato et al. | |
| 4,744,697 A | 5/1988 | Coppens | |
| 4,744,698 A | 5/1988 | Dallimer et al. | |
| 4,810,135 A | 3/1989 | Davenport et al. | |
| 4,867,605 A | 9/1989 | Myers et al. | |
| 4,868,408 A | 9/1989 | Hesh | |
| 4,868,970 A | 9/1989 | Schultz et al. | |
| 4,990,810 A | 2/1991 | Newhouse | |
| 5,592,816 A | 1/1997 | Williams | |
| 5,606,791 A | 3/1997 | Fougere et al. | |
| 5,609,441 A | 3/1997 | Khachaturian | |
| 5,656,880 A | 8/1997 | Clark | |
| 5,662,434 A | 9/1997 | Khachaturian | |
| 5,715,590 A | 2/1998 | Fougere et al. | |
| 5,800,093 A | 9/1998 | Khachaturian | |
| 5,998,905 A | 12/1999 | Fougere et al. | |
| 6,039,506 A | 3/2000 | Khachaturian | |
| 6,109,863 A | 8/2000 | Milliken | |
| 6,166,472 A | 12/2000 | Pinkerton | |
| 6,168,373 B1 | 1/2001 | Vauthier | |
| 6,232,681 B1 | 5/2001 | Johnston et al. | |
| 6,242,840 B1 | 6/2001 | Denk et al. | |
| 6,300,689 B1 | 10/2001 | Smalser | |
| 6,367,399 B1 | 4/2002 | Khachaturian | |
| 6,406,251 B1 | 6/2002 | Vauthier | |
| 6,409,466 B1 | 6/2002 | Lamont | |
| 6,445,099 B1 | 9/2002 | Roseman | |
| 6,476,709 B1 | 11/2002 | Wuidart et al. | |
| 6,612,781 B1 | 9/2003 | Jackson | |
| 6,648,589 B2 | 11/2003 | Williams | |
| RE38,336 E | 12/2003 | Williams | |
| 6,729,840 B2 | 5/2004 | Williams | |
| 6,770,987 B1 | 8/2004 | Sogard et al. | |
| 6,777,851 B2 | 8/2004 | Maslov | |
| 6,806,586 B2 | 10/2004 | Wobben | |
| 6,840,713 B1 | 1/2005 | Schia et al. | |
| 6,843,191 B1 | 1/2005 | Makotinsky | |
| 6,857,821 B2 | 2/2005 | Steenhuis et al. | |
| 6,957,947 B2 | 10/2005 | Williams | |
| 7,190,087 B2 | 3/2007 | Williams | |
| D543,495 S * | 5/2007 | Williams | D12/345 |
| 7,275,891 B2 | 10/2007 | Owen et al. | |
| 7,352,078 B2 | 4/2008 | Gehring | |
| 7,378,750 B2 | 5/2008 | Williams | |
| 7,425,772 B2 | 9/2008 | Novo Vidal | |
| 7,471,009 B2 * | 12/2008 | Davis et al. | 290/54 |
| 7,527,006 B2 | 5/2009 | Khachaturian | |
| 7,611,307 B2 | 11/2009 | Owen et al. | |
| 7,845,296 B1 | 12/2010 | Khachaturian | |
| 7,874,788 B2 | 1/2011 | Stothers et al. | |
| 8,310,077 B2 | 11/2012 | Pearce | |
| 2002/0034437 A1 | 3/2002 | Williams | |
| 2003/0044272 A1 | 3/2003 | Addie et al. | |
| 2003/0137149 A1 | 7/2003 | Northrup et al. | |
| 2003/0168864 A1 | 9/2003 | Heronemus et al. | |
| 2003/0193198 A1 | 10/2003 | Wobben | |
| 2003/0218338 A1 | 11/2003 | O'Sullivan et al. | |
| 2004/0021437 A1 | 2/2004 | Maslov et al. | |
| 2004/0201299 A1 | 10/2004 | Naritomi et al. | |
| 2004/0227500 A1 | 11/2004 | O'Meara | |
| 2004/0232792 A1 | 11/2004 | Enfourth | |
| 2004/0262926 A1 | 12/2004 | Hansen | |
| 2005/0005592 A1 | 1/2005 | Fielder | |
| 2005/0031442 A1 | 2/2005 | Williams | |
| 2006/0261597 A1 | 11/2006 | Gehring | |
| 2007/0018459 A1 | 1/2007 | Williams | |
| 2007/0063448 A1 | 3/2007 | Kowalczyk | |
| 2007/0231072 A1 | 10/2007 | Jennings et al. | |
| 2007/0291426 A1 | 12/2007 | Kasunich et al. | |
| 2008/0012538 A1 | 1/2008 | Stewart et al. | |
| 2009/0278357 A1 * | 11/2009 | Williams | 290/53 |
| 2010/0025998 A1 * | 2/2010 | Williams | 290/52 |
| 2010/0026002 A1 | 2/2010 | Spooner | |
| 2010/0068037 A1 * | 3/2010 | Ives | 415/121.2 |
| 2010/0172698 A1 | 7/2010 | Ives et al. | |
| 2010/0201129 A1 | 8/2010 | Holstein et al. | |
| 2010/0232885 A1 | 9/2010 | Ives et al. | |
| 2010/0295388 A1 | 11/2010 | Ives et al. | |
| 2011/0018274 A1 * | 1/2011 | Ives et al. | 290/52 |
| 2011/0088253 A1 | 4/2011 | Ives et al. | |
| 2011/0110770 A1 | 5/2011 | Spooner et al. | |
| 2012/0187680 A1 | 7/2012 | Spooner et al. | |
| 2012/0235412 A1 | 9/2012 | Dunne et al. | |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |

(56) References Cited

FOREIGN PATENT DOCUMENTS

| | | |
|---|---|---|
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | WO03025385 | 3/2003 |
| WO | WO 03025385 A2 * | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | WO2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | WO2008081187 | 7/2008 |
| WO | WO2011039249 | 4/2011 |
| WO | WO2011039255 | 4/2011 |
| WO | WO2011039267 | 7/2011 |

OTHER PUBLICATIONS

PCT Written Opinion of International Searching Authority (Aug. 31, 2007).
PCT Request for Processing of International Application (Jul. 13, 2007).
U.S. Appl. No. 13/133,235, filed Jun. 7, 2011, including the specification, claims and drawings.
U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,507, filed Jun. 8, 2011, including the specification, claims and drawings.
U.S. Appl. No. 13/133,832, filed Jun. 9, 2011, including the specification, claims and drawings.
U.S. Appl. No. 13/264,667, filed Oct. 14, 2011, including specification, claims and drawings.

* cited by examiner

TURBINES HAVING A DEBRIS RELEASE CHUTE

BACKGROUND OF THE INVENTION

This invention relates generally to the field of turbines or power plants that produce electricity by harnessing the flow of a liquid, in particular water, and more particularly relates to such devices wherein the liquid flow causes rotation of a large propeller-type or impellor-type rotor having an annular outer rim disposed within a large annular housing.

Production of electricity using large turbines is well known. Typically, hydroelectric turbines are mounted in dams such that controlled liquid flow causes rotation of a propeller-type rotor or blades. Such relatively rapid water flow conditions are known as high head conditions. It is also known to place turbines in low head conditions, such as produced by tidal flow in a bay, at the mouth of a river or offshore. Such turbines are typically mounted onto large support shafts.

While most turbines are constructed to have a central rotating shaft onto which the blades or runners are mounted, it is also known to produce open-centered turbines, also known as rim-mounted turbines. Turbines having open-centered rotors, where the blades are mounted between inner and outer annular rings or rims and where the energy is transferred through the outer rim to an annular housing that retains the rotor, can be particularly successful in low head conditions, i.e., in slower currents.

Examples of open center, rim-mounted turbines can be seen in U.S. Pat. No. 5,592,816 issued Jan. 14, 1997, and reissued as RE38,336 on Dec. 2, 2003, U.S. Pat. No. 6,648,589 issued Nov. 18, 2003, U.S. Pat. No. 6,729,840 issued May 4, 2004, and U.S. Patent Appl. Publication US2005/0031442 published Feb. 10, 2005 (Ser. No. 10/633,865). Examples of hydroelectric turbines used in low head (tidal flow) conditions can be seen in U.S. Pat. No. 4,421,990 to Heuss et al., U.S. Pat. Nos. 6,168,373 and 6,406,251 to Vauthier, UK Patent Appl. No. GB 2,408,294 to Susman et al., and WIPO International Publication WO 03/025385 to Davis et al.

Liquid powered turbines are seen as environmentally safe replacements for electrical power plants that utilize fossil fuels or atomic energy. In harnessing water to produce electricity on a large scale capable of powering industrial complexes, towns, cities, etc., it is necessary to provide large numbers of turbines, and it is necessary that the turbines be as large as practical in order to maximize the amount of electricity produced by each turbine. The rotor blades of these turbines are multiple meters in length, with some experimental designs having blades exceeding 50 meters in length.

As the length of the rotor blades is increased, structural and manufacturing challenges are presented that are not encountered in smaller turbines or generators. For shaft-mounted turbines, it is difficult to provide long blades that are both strong and light. In one solution, the blades of the shaft-mounted turbine are provided with an outer annular rim, which is contained within an annular housing, thereby providing support to the blades through the shaft and the rim. Alternatively, rim-mounted turbines with no central shaft provide a solution to this problem by providing annular support to the inner and outer ends of the blade, with the outer support rim being retained within a housing having an annular slot or channel. In a typical means for generation of electrical power, a large number of magnets are spaced along the annular support rim and a large number of coils are spaced along the receiving channel in the stator housing. The magnetic field established by the rotor field system passes across the gap that separates the rotor and the stator. Rotation of the rotor causes the magnetic flux linkage with the coils to change, inducing an electro-magnetic force in the coils.

Because the annular outer rim of the rotor is received within a channel in the stator housing, liquid-borne debris may be captured within the channel. Any significant accumulation of debris will interfere with rotation of the rotor and may cause damage. The accumulation of debris may be most problematic in low head conditions, such as with a tidal flow generator, since it is easier for debris to settle into the housing channel from the relatively slow moving water.

It is an object of this invention to provide an improved structure for a turbine having an annular outer rim disposed on the rotor blades, the outer rim being retained within a channel disposed in a housing, such that accumulation of debris in the channel is minimized or eliminated. It is a further object to provide such a turbine wherein one or more debris release chutes are disposed in the housing channel, such that debris captured between the rotor outer rim and the channel housing will drop out or be flushed from the turbine.

SUMMARY OF THE INVENTION

The invention is an improved liquid powered turbine, preferably water powered, of the type wherein the rotor blades are supported by an annular outer rim and the outer rim is maintained within or received by a housing having a channel to receive the outer rim. In a typical construction, the turbine is a generator in that magnets are disposed on the rotor outer rim and coils are disposed in the housing or stator channel, such that rotation of the rotor within the stator produces electricity. The improvement is particularly beneficial wherein the turbine is of the type that is submerged in a body of water that provides low head conditions, such that the rate of water flow through the turbine is relatively slow.

The improvement comprises providing one or more debris release chutes, channels or openings in the housing channel, such that any debris captured between the rotor outer rim and the housing channel can escape by passage through the debris release chutes, either as a result of gravity effects or by the flushing effect of liquid movement through the debris chutes.

DETAILED DESCRIPTION OF THE INVENTION

Figure 1:
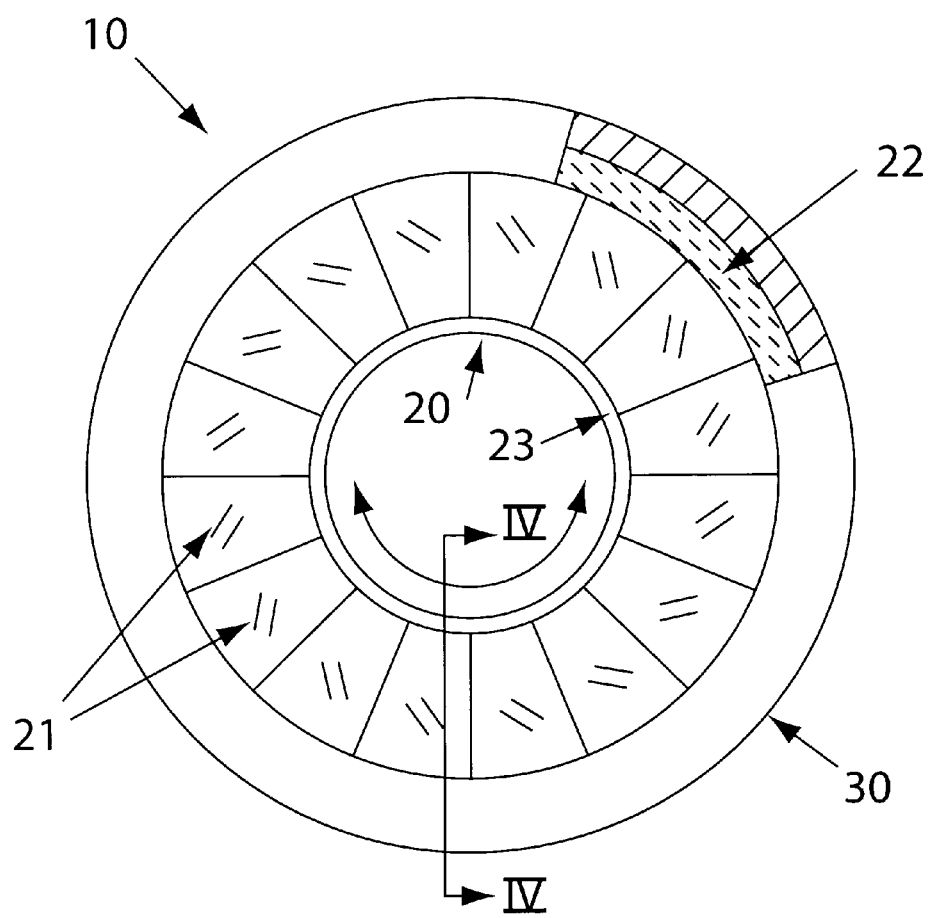
FIG. 1 is a view of a representative turbine, in this case an open-center, rim-mounted turbine, the turbine comprising a rotor having an outer annular rim and a stator housing having a channel to receive the rotor outer rim, as seen from the axial perspective.

With reference to the drawings, the invention will now be described in detail with regard for the best mode and the preferred embodiment. In a most general sense, the invention is a turbine for the production of electricity. In a typical representative embodiment, the turbine comprises a rotor mounted within a stator housing, the rotor having an annular outer rim that is received and retained by an annular channel or slot in the stator housing. The electricity generator means may comprise the combination of a large number of magnets disposed on the rotor annular rim and a large number of coils disposed on the interior of the stator housing, preferably within the channel that receives the rotor annular rim, although other generator means may be utilized. For purposes of illustration, the turbine is shown in the drawings as an open-center, rim-mounted rotor, such that all support for the rotor is provided by the stator housing, but it is to be understood that the invention also applies to a turbine having a shaft-mounted rotor with an outer annular rim. It is also to be understood that the invention is applicable to any turbine having an outer rim received within a housing regardless of the type of electricity generator means chosen.

Figure 2:
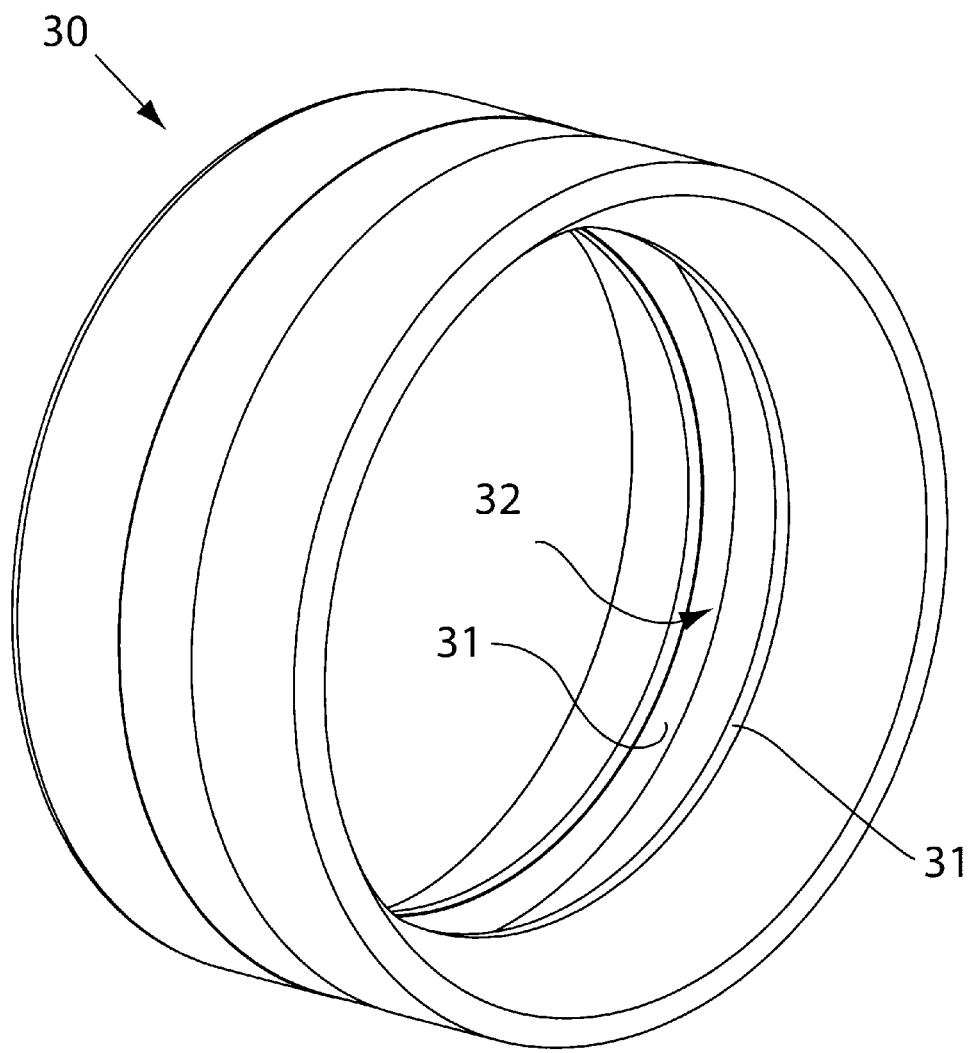
FIG. 2 is a perspective view of the stator housing.
Figure 3:
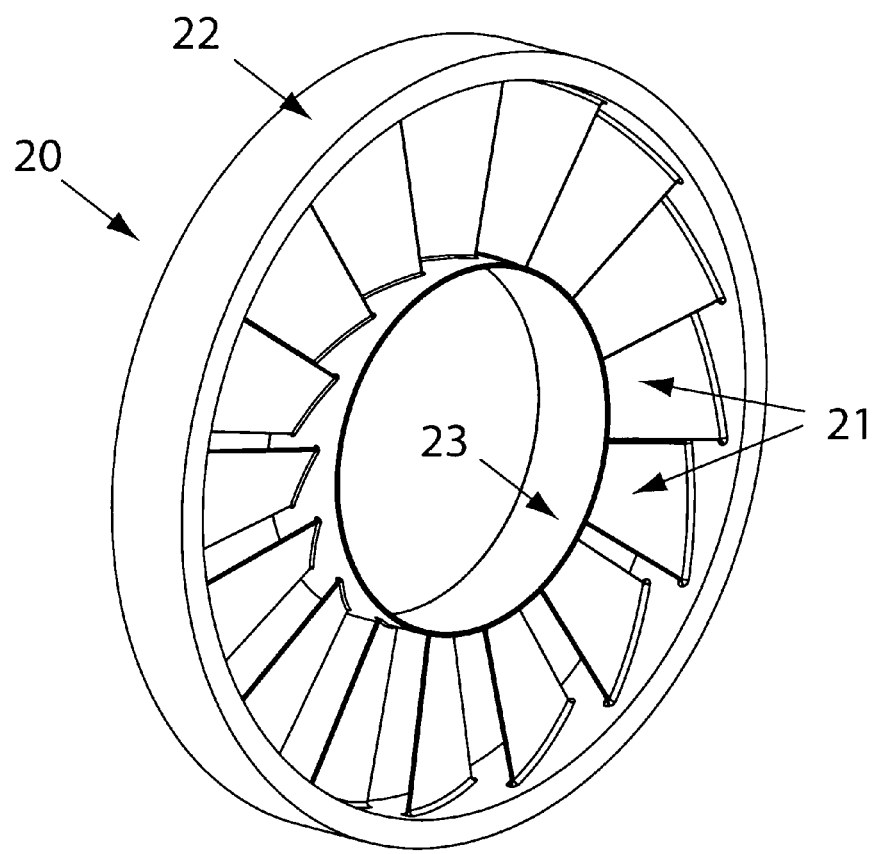
FIG. 3 is a perspective view of the rotor.

As shown generally in FIGS. 1 through 3, the invention is a turbine or power plant 10 comprising a generally annular housing 30. The configuration of housing 30 shown is not meant to be limiting, as other configurations are possible provided the housing 30 accomplishes among other purposes the retaining of the rotating assembly or rotor 20 against undesired movement in either axial or radial direction and the allowing of rotation of the rotor 20 about the rotational axis. Housing 30 comprises a pair of retaining flanges 31 that define a channel 32 to receive and retain the rotor 20.

The rotating assembly or rotor 20 comprises an inner annular rim member 23 and an annular outer rim member 22, the rims 22 and 23 preferably being relatively thin in the direction perpendicular to the central rotation axis. Extending between inner rim 23 and outer rim 22 are a plurality of propellers, runners or blade members 21, the blades 21 being angled or twisted in known manner such that movement of liquid in the axial direction and through the stator housing 30 results in rotation of the rotor 20. The particular number, configuration and material composition of the blades 21 may vary, but preferably the blades 21 are constructed to be as lightweight as possible without excessively sacrificing structural integrity.

In most circumstances the turbine 10 is oriented such that the axis of the rotor 20 is generally horizontal such that the blades 21 rotate in a generally vertical plane. The annular channel 32 of the housing 30 is thus also oriented so as to occupy a generally vertical plane. Because of this, the channel 32, and in particular the lowermost portion of the channel 32, becomes a receptacle for any debris that is captured between the rotor 20 and the housing 30, the debris being deposited as the driving liquid passes through the turbine 10. This problem of debris accumulation in the housing channel 32 is especially present in hydroelectric turbines 10 used in low head situations, such as turbines 10 that are powered by tidal flow. The relatively slow movement of the water, coupled with the relatively high concentration of debris, presents circumstances where significant amounts of debris may be captured between the rotor 20 and the housing 30. Rotation of the rotor 20 within the stationary housing 30 in conjunction with gravity effects results in the debris accumulating in the channel 32 and particularly in the bottom of the channel 32. If the accumulation amount is significant, either in terms of the amount of debris or the size of discrete objects, rotation of the rotor 20 may be adversely affected by increased friction effects, such that the efficiency of the turbine is reduced. Furthermore, the accumulated debris may damage the surfaces of the rotor 20 or the channel 32, which may be particularly harmful where the turbine utilizes magnets and coils mounted in the outer rim 22 and the channel 32.

Figure 4:
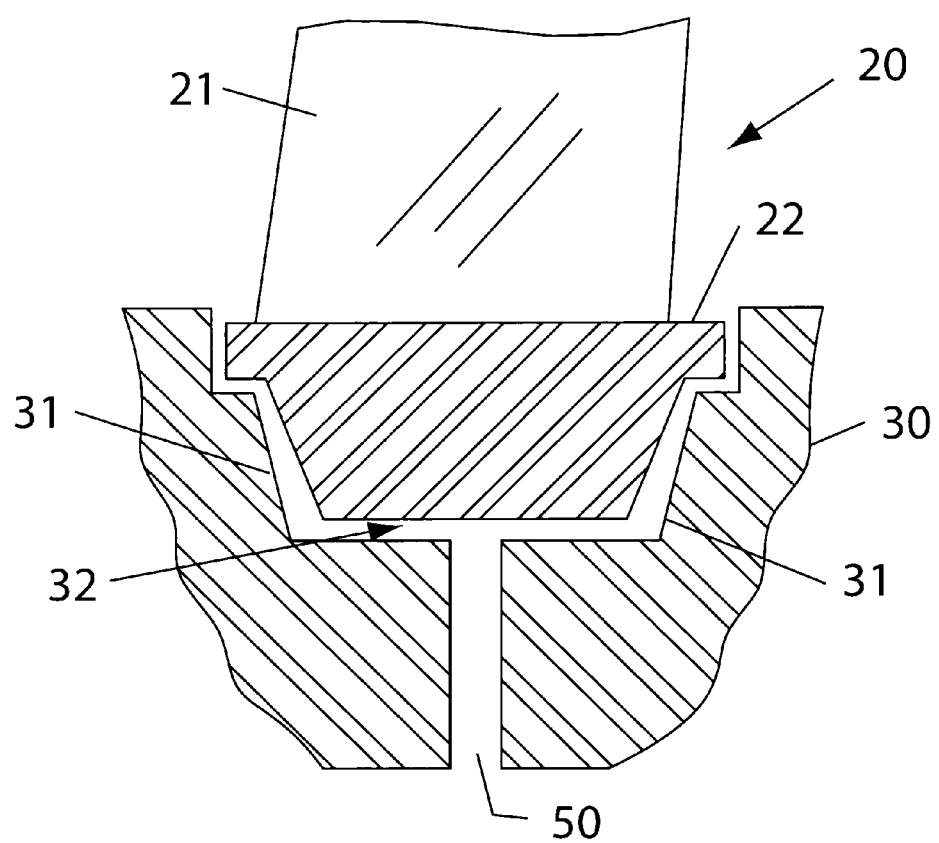
FIG. 4 is a partial cross-sectional view taken along line IV-IV of FIG. 1, showing the debris chute disposed in the stator housing.

To address the issue of debris accumulation, the housing 30 is provided with one or more debris release chutes, channels or openings 50, as shown in FIG. 4, such that any debris captured within the channel 32 has a means of escape or release. The debris release chutes 50 are preferably oriented, in use, generally downward, such that gravity effects will encourage release of the debris. Although not required, at least one of the debris release chutes 50 is most preferably disposed directly in the bottom or lowermost portion of the housing channel 32. Because the rotation effects of the turbine 10 may result in debris movement within the channel 32 in the circumferential direction, the debris release chutes 50 may be positioned at intervals about the entire channel 32, including in the upper portion above horizontal. The particular size, orientation and configuration of the debris release chutes 50 are matters of engineering design choice and may vary from that shown in the drawing. For example, while the debris release chute 50 is shown in FIG. 4 as being perpendicular to the axis of rotation of the turbine 10, the debris release chutes 50 may be oriented in non-perpendicular directions. Likewise, while the debris release chute 50 in FIG. 4 has parallel walls, the debris release chutes may be formed such that the bore increases or decreases in dimension.

It is to be understood that equivalents and substitutions for certain elements set forth above may be obvious to those skilled in the art, and therefore the true scope and definition of the invention is to be as set forth in the following claims.

The invention claimed is:

1. A liquid powered turbine comprising a rotor having an outer rim mounted on blades, a housing having a channel receiving said outer rim of said rotor, wherein at least one debris release chute is disposed in said channel and extends unoccluded through said housing, such that debris captured between said rotor outer rim and said housing channel is released through said at least one debris release chute, wherein said at least one debris release chute is positioned, in use, in a lower portion of said housing channel.

2. The turbine of claim 1, wherein said at least one debris release chute is, in use, downwardly oriented.

3. The turbine of claim 1, wherein said at least one debris release chute comprises a plurality of debris release chutes.

4. The turbine of claim 3, wherein all of said debris release chutes are, in use, downwardly oriented.

5. The turbine of claim 3, wherein said plurality of debris release chutes are positioned about said housing channel such that some of said debris release chutes are, in use, in an upper portion of said housing channel.

* * * * *